Aug. 11, 1925.  1,549,539
C. H. HAST
ROAD AND FARM IMPLEMENT
Filed Nov. 18, 1922   2 Sheets-Sheet 1
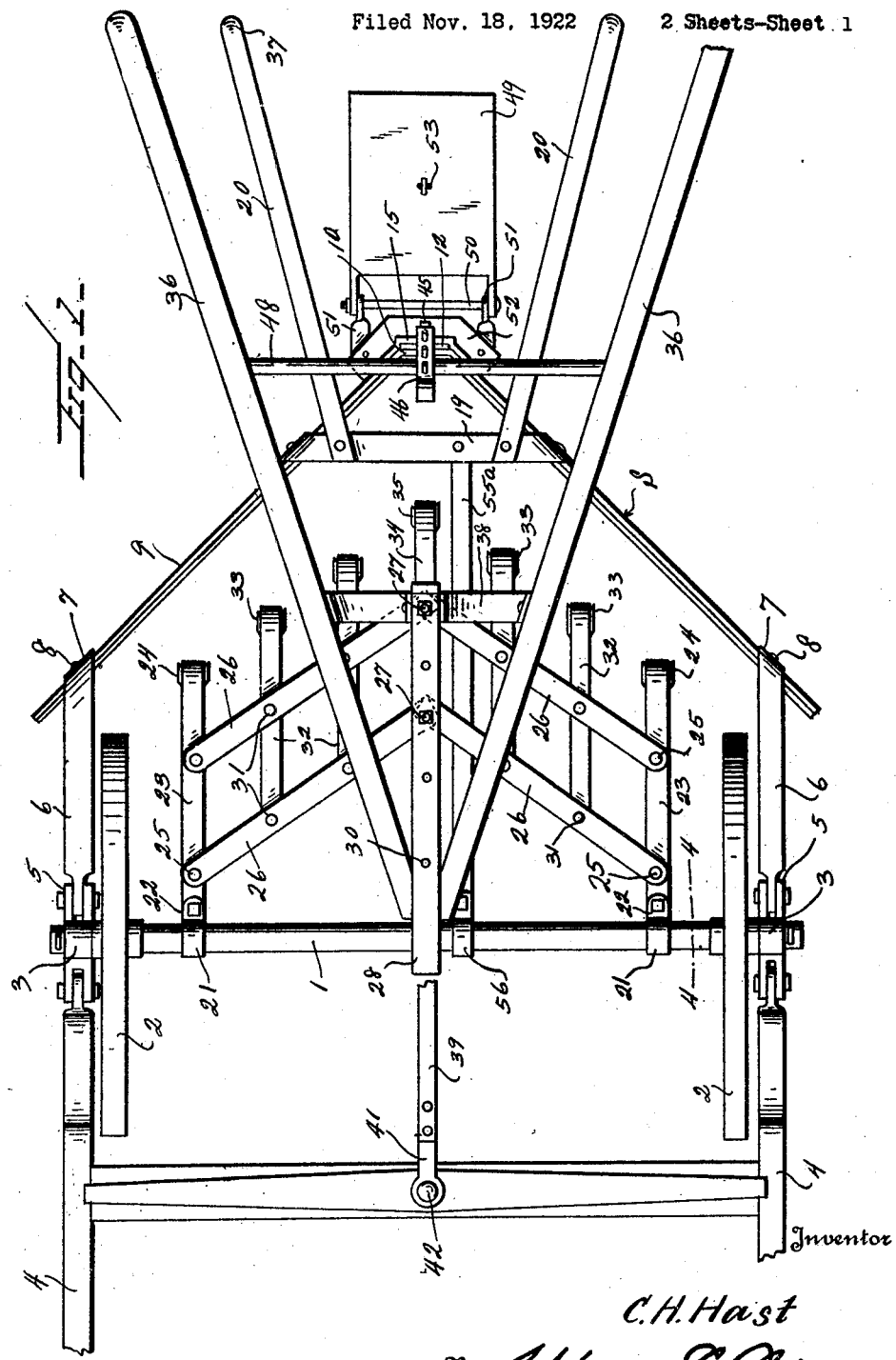
Inventor
C. H. Hast
By Watson E. Coleman
Attorney

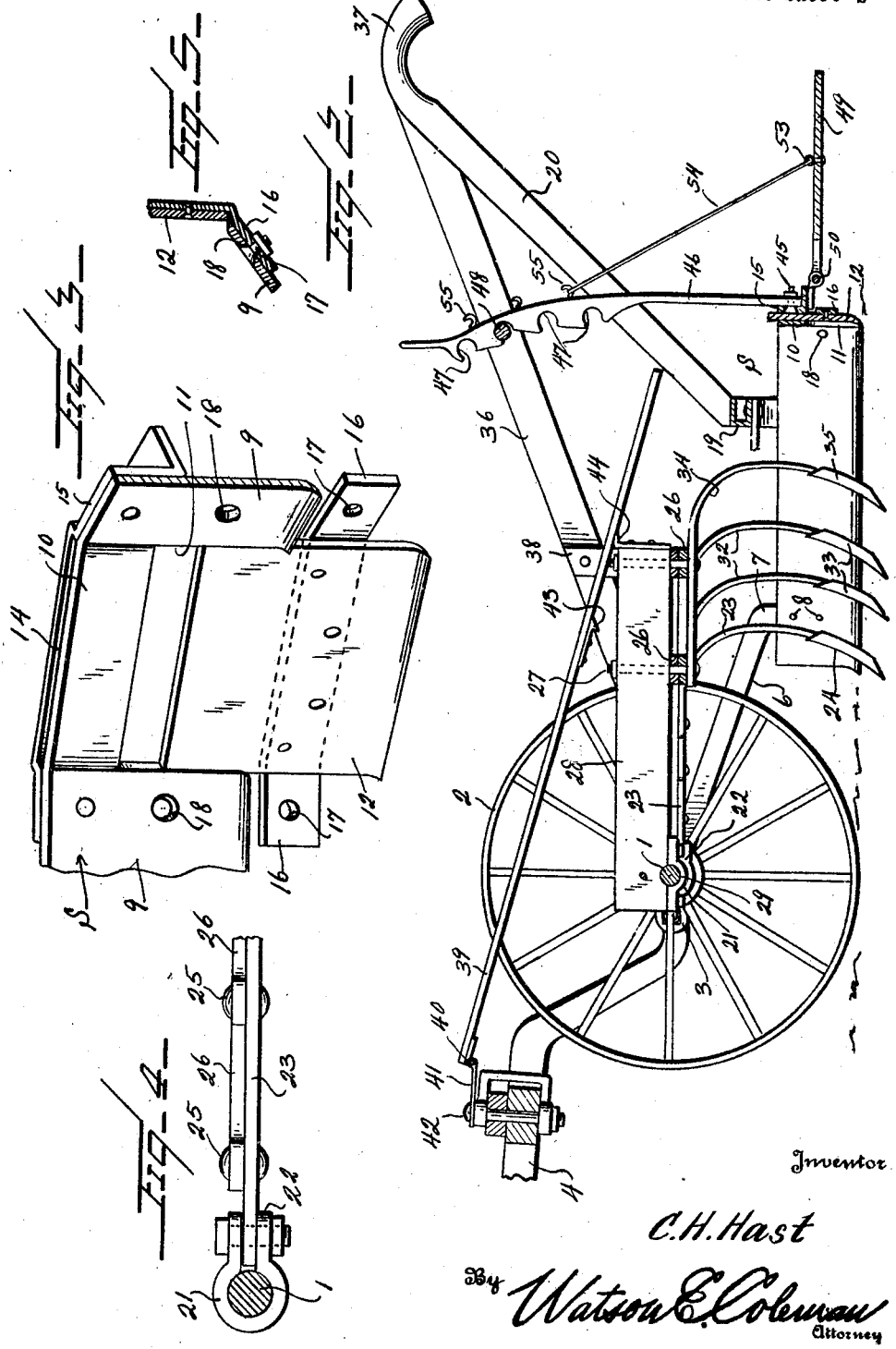

Patented Aug. 11, 1925.

1,549,539

UNITED STATES PATENT OFFICE.

CHARLES H. HAST, OF McLOUD, OKLAHOMA.

ROAD AND FARM IMPLEMENT.

Application filed November 18, 1922. Serial No. 601,752.

*To all whom it may concern:*

Be it known that I, CHARLES H. HAST, a citizen of the United States, residing at Mc-Loud, in the county of Pottawatomie and State of Oklahoma, have invented certain new and useful Improvements in Road and Farm Implements, of which the following is a specification, reference being had to the accompanying drawings.

This invention relates to a road and farm implement and it is an object of the invention to provide a device of this general character having novel and improved means whereby it can be employed with facility and convenience in repairing of roads and which may also be used with equal facility in treating soil for agricultural purposes.

Another object of the invention is to provide a novel and improved device of this general character embodying a ground working or digging means together with a scraping or leveling element wherein said means or element may be simultaneously used or adjusted for separate or independent use.

Furthermore, it is an object of the invention to provide a novel and improved device of this general character embodying a portable frame having operatively engaged therewith a vertically swinging frame provided with ground working members together with a scraping or leveling element also supported by the body for vertical swinging movement together with means whereby said frame and scraping or leveling element may be maintained in a raised or inoperative position in accordance with the requirements or necessities of practice.

An additional object of the invention is to provide a novel and improved device of this general character comprising a substantially V-shaped scraping or leveling element with the apex portion thereof rearwardly disposed together with a means at the apex portion of the bar to permit dirt or the like to be discharged through said portion of the scraping or leveling element in order to fill in ruts, ditches, or the like.

The invention consists in the details of construction and in the combination and arrangement of the several parts of my improved road and farm implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of an implement constructed in accordance with an embodiment of my invention, the shafts comprised in the draft rigging being in fragment;

Figure 2 is a longitudinal sectional view taken substantially centrally through the device as illustrated in Figure 1;

Figure 3 is an enlarged fragmentary view in perspective of the rear or apex portion of the scraping or leveling element with parts omitted and with the movable gate partially removed;

Figure 4 is an enlarged fragmentary sectional view taken substantially on the line 4—4 of Figure 1, and Figure 5 is a detail sectional view showing means for holding the gate in closed position.

As disclosed in the accompanying drawings, 1 denotes an axle having mounted on the opposite end portions thereof supporting wheels 2, said axle 1 outwardly of and immediately adjacent to the wheels 2 having fixed thereto clips 3 with which are operatively engaged the shafts 4.

The clips 3 are each provided with rearwardly directed spaced ears 5 between which are disposed the forward end portions of rearwardly directed arms 6.

The arms 6 are of predetermined length and terminate in the depending portions 7 having their extremities riveted as at 8 or otherwise secured to the rear faces of the opposite end portions of the scraping or leveling element S. The scraping or leveling element S is substantially V-shaped in form with its apex rearwardly disposed and comprises the scraping blades 9 converging rearwardly. The inner ends of the blades 9 are connected at their upper portions by a transversely disposed strip 10, the portion of the element S below the strip 10 providing an opening 11. The opening 11 is adapted to be closed by the vertically movable gate 12 which has its upper portion extending through the guide loop 14 provided by the plate 15.

The gate 12 has extending laterally therefrom the wings 16 which, when the gate 12 is in closed position overlies the rear faces of the blades 9 adjacent the opening 11. These lugs 16 are provided with the openings 17 which, when the gate is in closed position register with the openings 18 provided in the adjacent end portions of the blades 9 and through which registering openings suitable clamping members such as bolts are directed to maintain the gate in its closed position.

Secured to the blades 9 at desired points inwardly of their inner ends is an upstanding arch member 19 to which are secured the upstanding and rearwardly directed handle members 20 providing means whereby desired manipulation of the element S may be had readily by an operator trailing the implement.

Loosely mounted on the axle 1 inwardly of the wheels 2 are the slip collars 21 each having its ends continued by the ears or lugs 22 between which extend the forward extremities of the side spring arms or teeth 23 of a conventional type and which are provided at the rear or lower ends with the shovel plows 24 preferably of a reversible type.

Pivotally connected as at 25 to the arms or teeth 23 at predetermined points spaced longitudinally thereof are the outer extremities of the bars 26. Corresponding arms 26 having their inner end portions overlapping and connected by the bolts 27. The bolts 27 are also disposed upwardly through a beam 28.

The beam 28 has its forward end portion pivotally connected by the bearing 29 or the like with the axle 1, said beam extending rearwardly of the implement a predetermined distance, the connection between the beam 28 and the arms 26 resulting in said beam and arms having unitary swinging movement in a vertical direction.

As the collars 21 are slidably mounted upon the axle 1 said collars may be adjusted lengthwise of the axle 1 to vary the angular relation of the arms 26 as may be preferred and also adjusted to bring the corresponding arms 26 substantially in alignment. In order to effect this adjustment of the arms 26 it is to be understood that the bolts 27 must be first removed and in order to hold the arms 26 in their different positions the beam 28 at points spaced longitudinally thereof is provided with the vertically directed openings 30 through which the bolts 27 are adapted to be disposed.

The arms 26 at each side of the machine are in parallelism and pivotally connected with said arms as at 31 are the spring arms or teeth 32 also of a conventional type and provided at their rear or lower ends with the shovel plows 33 preferably reversible. The bolts 27 also engage and hold in applied position a central or intermediate spring arm or tooth 34 provided at its rear or lower end portion with a reversible shovel plow 35.

Secured to the beam 28 at opposite sides thereof and at a point in close proximity to the axle 1 are the upwardly and rearwardly directed handle members 36 whereby the operator may conveniently manipulate the beam 28 and the spring arms or teeth operatively connected therewith may be readily manipulated as may be required. As is particularly illustrated in Figure 2, it is to be noted that the hand grasps 37 of the handle members 20 and 36 are substantially horizontally aligned under normal conditions and arranged at such altitudes as to permit such handle members 20 and 36 to be engaged by the operator with convenience and facility. Interposed between the rear portion of the beam 28 and the adjacent portions of the handle members 36 are the brace members 38 which also serve to further assure the requisite moving of the beam 28 through the instrumentality of the handle members 36.

A reach or rod 39 extends longitudinally of the machine and has its forward end portion pivotally connected as at 40 with a plate 41 or the like held in working position by the singletree bolt 42. The reach or rod 39 extends rearwardly and downwardly, and at a desired point inwardly of its rear or lower end is provided with a depending latch 43.

When it is desired to position the plows 24, 33 and 35 in a raised or inoperative position it is only necessary to swing the handle members 36 upwardly until the latch 43 engages a catch 44 carried by the rear end of the beam 28.

It is to be noted that the plows and parts associated therewith are positioned in advance of the scraping or leveling element S and that the plows 24 work the soil or ground inwardly of the outer ends of the blades 9 of the element S. By this means it will be assured that the earth loosened by the plows 24, 33 and 35 will be properly engaged by the blades 9, which is of particular importance when leveling as the loosened earth may be caused by the blades 9 to fill in any inequalities in the surface being worked.

In filling heavy ruts, ditches or the like, the gate 12 is removed, so that the loosened dirt may pass through the opening 11, it being understood that in such work the opening 11 is caused to travel directly over the rut or ditch being filled.

Secured to the central part of the plate 15 by the bolt 45 or the like is the lower end portion of a vertically disposed bar 46 possessing a certain degree of inherent resiliency.

The upper portion of the member 46 is provided with forwardly facing pockets or recesses 47 spaced longitudinally of the member 46 and in each of which is adapted to be received the member or round 48 connecting the upper portions of the handle members 36. When the round or member 48 is engaged within the uppermost pocket or recess 47 the beam 28 is held sufficiently raised to maintain the plows 24, 33 and 35 above the ground with the weight of the beam and the parts carried thereby disposed upon the element S whereby the functioning of said element S is facilitated. The lower pockets or recesses 47 provide means in conjunction with the member or round 48 to regulate or control the extent of penetration of the plows within the soil.

When the round or member 48 is engaged within any one of the pockets or recesses 47 the plows and scraping element S may be raised in unison and maintained in said raised position by the latch 43 engaging the catch 44. By pulling rearwardly upon the upper portion of the member 46 the same may be disengaged from the member or round 48 permitting the element S to drop leaving the plows raised.

In order to impose an additional weight upon the element S as may be required I provide a foot piece 49. As herein disclosed, this foot piece 49 is hingedly connected as at 50 with rearwardly disposed arms 51 suitably secured to the opposite end portions of a flange 52 defining the lower marginal portion of the plate 15. Operatively engaged as at 53 with the central portion of the plate 49 is a rod 54 adapted to be selectively engaged with the hook 55 extending rearwardly from the upper portion of the member 46. By this means, the plate or member 49 may be maintained in a substantially horizontal position or supported in a raised position when not in use. The member or plate 49 can also be permitted to swing down to drag on the ground. The pivot 50 preferably comprises a removable bolt as is particularly illustrated in Figure 1 so that the member or plate 49 may be applied or removed as required with facility.

I also find it of advantage to connect to the intermediate portion of the arch member 19 an extremity of a rod 55ª which extends forwardly of the machine and is operatively connected with a collar 56 mounted upon the axle 1 at a suitable position between the collars 21.

From the foregoing description it is thought to be obvious that a road and farm implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described comprising a portable member, a beam operatively engaged therewith for swinging movement in a vertical direction, ground working elements operatively connected with the beam, a scraping element positioned rearwardly of the ground working elements, means for operatively connecting said scraping element with the member for swinging movement in a vertical direction independently of the beam, and co-acting means carried by the beam and scraping member for imposing the weight of the beam upon the scraping element.

2. An apparatus of the class described comprising a portable member, a beam operatively engaged with said member for movement in a vertical direction, ground working members operatively connected with the beam, a scraping element positioned rearwardly of the ground working elements, an operative connection between the element and the member, permitting the elements to have vertical movement independently of the beam, an upstanding element carried by the scraping element, and co-acting means carried by the beam and the upstanding member for adjustably connecting the upstanding member and beam to hold the beam in different vertical positions.

3. A machine of the class described comprising a portable member, ground working members operatively engaged therewith for vertical swinging movement, a scraping element positioned rearwardly of the ground working members, means for operatively connecting the scraping element with the member for vertical swinging movement independently of the ground working members, an upstanding member carried by the scraping element, means associated with the ground working members and co-acting with the upstanding member to support the ground working members, said means engaging with the upstanding member permitting the ground working members and the scraping element to have unitary upward swinging movement.

4. A machine of the class described comprising a portable member, ground working members operatively engaged therewith for vertical swinging movement, a scraping element positioned rearwardly of the ground working members, means for operatively connecting the scraping element with the member for vertical swinging movement independently of the ground working members, an upstanding member carried by the scraping element, means associated with the ground working members and co-acting with the upstanding member to support the ground working members, said means engaging with the upstanding member permitting the ground working members and the scraping element to have unitary upward swinging movement, and means coacting with the ground working elements to maintain said ground working members and the scraping element elevated.

5. A machine of the class described comprising, in combination, a portable member, ground working members operatively engaged therewith for vertical swinging movement, handle members operatively engaged with the portable member, a round connecting the handle members, a scraping element positioned rearwardly of the ground working members, means for operatively connecting the scraping element with the portable member for vertical swinging movement independently of the ground working members, an upstanding resilient member carried by the scraping element, the upper portion of said member being provided with recesses adapted to selectively receive the round to either maintain the ground working members in a raised position or to regulate the extent of penetration of said ground working members, the engagement between the resilient member and round also permitting the ground working members and the scraping element to have unitary upward swinging movement.

In testimony whereof I hereunto affix my signature.

CHARLES H. HAST.